United States Patent Office 2,942,960
Patented June 28, 1960

2,942,960
CONVERSION OF HYDROCARBONS

Max Gerhold, 48 Nibelungengasse, Graz, Austria

No Drawing. Filed May 29, 1956, Ser. No. 587,956

Claims priority, application Germany June 7, 1955

9 Claims. (Cl. 48—215)

This invention relates to a method of converting fluid, i.e. gaseous or liquid hydrocarbons or mixtures thereof, e.g. butane or the like, petroleum or its residues, into gases consisting substantially of low-molecular carbon products, e.g. $C_2H_4$, $CH_4$, CO, and hydrogen.

It has already been suggested to produce such gases by thermal decomposition of gaseous or liquid hydrocarbons at high temperatures, preferably above 900° C., under simultaneous conversion with hydrogen, air and/or oxygen, at normal pressure or increased pressure and in the presence of dehydrogenation catalysts. These processes, however, have the disadvantage that the reaction cannot be controlled so as to obtain always the same desired gases or gas mixtures. Also, larger quantities of aromatic substances, tar, soot, and elementary carbon are produced by the conversion, which substances disturb the course of the reaction and reduce the yield of desired products. Furthermore, the final products contain relatively large quantities of inert ballast materials, e.g., primarily $CO_2$. It is an object of the present invention to provide a method of achieving a desired conversion which does not have these disadvantages.

With the above and further objects in view, the process according to the present invention is carried out in two stages in the presence of decomposition catalysts for the selective decomposition of hydrocarbons which catalysts are able to absorb and deliver electrons on their active boundary surfaces. More particularly, according to the invention, in the first stage of the reaction the molecules of the initial substances are decomposed into smaller fractions by cracking the initial substances in contact with decomposition catalysts for the selective decomposition of hydrocarbons which are able to absorb and deliver electrons on their active boundary surfaces, and in the second stage of the reaction the thus-obtained decomposed products are reacted with oxidizing gases.

Uncontrollable auxiliary reactions cannot occur in this process, since the initial substances, i.e., the higher and high molecular weight hydrocarbons, do not come into contact with the oxidizing gases.

The two steps of the reaction can be carried out in regard to space and time entirely separately from each other, or directly succeeding each other as to space and time, or even in one chamber. For instance, it is possible to fill the decomposition products obtained in the first reaction step into suitable containers to convey the same to a distant production facility and there to treat the decomposition products with oxidizing gases in the second reaction step.

It has been found advisable, however, to connect the second reaction stage directly to the first one, since the decomposed products in this case can be fed to the second reaction stage already at the temperature at which the decomposed gas is produced, so that the step of heating the gases to this temperature is saved.

It was found to be advantageous to pass the initial substances in the first reaction stage, possibly in a preheated condition, at a temperature of at least 500° C., and preferably 600–750° C., preferably in a finely distributed condition, over the decomposition catalysts for the selective decomposition of hydrocarbons which are able to absorb and deliver electrons on their active boundary surfaces, and to subject the decomposed gas thus obtained in the second reaction stage to a reaction with oxidizing gases, at a temperature at least as high as the temperature prevailing during the production of the decomposed gas, and preferably at a temperature of 700–900° C.

Compared to the temperatures above 900° C. applied in the known processes the possibility of carrying out the reaction at temperatures which might be as low as 500° C. means a considerable saving of heat.

Advantageously the reaction in the first stage is carried out at temperatures between 600 and 750° C. In this temperature range the tendency of the decomposed products formed in the primary steps, of forming cyclic compounds, is very small and the dehydrogenation of the cyclic compounds to aromatic substances and their condensation to tar etc. occurs only to a small extent.

An advantage obtained by the use of decomposition catalysts for the selective decomposition of hydrocarbons which catalysts are able to absorb and deliver electrons on their active boundary surfaces consists in the fact that the molecules of the high-molecular hydrocarbons are decomposed primarily in the middle and that mainly fractions with 2, 3 and 4 carbon atoms, chiefly of an olefinic and paraffinic structure, are obtained. These fractions are not capable of reacting with each other at the prevailing reaction temperatures. Therefore, uncontrollable secondary reactions cannot occur.

Advantageously, the initial substance is preheated, preferably to 200–300° C., in order to increase the reaction velocity. A further increase of the reaction velocity can be attained by contacting the initial substance, in a finely dispersed condition, with the surface of the catalysts.

The decomposed gas obtained in the first stage of the reaction and consisting mainly of 30 to 50% olefines, 15–30% methane, and 15–20% hydrogen (all by volume) is caused to react in the second reaction stage, preferably at temperatures between 700 and 900° C., with oxidizing gases. Experience has shown that the largest yield of final products is obtained within this temperature range. It was found, however, that already at temperatures equal to the temperature prevailing during the production of decomposed gas, i.e. at temperatures down to 500° C., satisfactory results can be obtained.

The contact time of the material in the individual reaction stages depends upon the kind of the initial material and the desired final product. In tests which have been carried out a total contact time of less than 15 seconds, i.e. 3–10 seconds, ½ to ⅓ thereof in the first stage and the rest in the second stage, proved to be fully satisfactory.

According to the invention, the course of the reaction can be controlled so as to obtain the desired final product by changing the reaction temperature and/or the contact time of the material to be treated in the two reaction stages and/or the ratio of the material to the oxidizing gases.

Preferably, steam, air or oxygen, alone or in mixtures with each other, are used as oxidizing gases. The quantity of the oxidizing gases to be added depends on their oxygen component in proportion to the carbon component of the initial material and the desired final product. Thus, for producing town gas, oxidizing gases, e.g., steam, are added only in such proportion that the reaction will take place, for instance, according to the following equation:

$$(CH_4+C_2H_4)+H_2O=2CH_4+CO+H_2$$

Hence, the amount of oxygen which is introduced with the oxidizing gases will be limited so that only the hydrocarbon atoms with more than one C atom in the molecule are converted into CH₄ and CO.

In the production of synthetic gas, oxidizing gases are added in such a quantity that the entire C component of the initial material is converted into CO. If the initial fluid is the same as in the production of town gas, the reaction would proceed as follows:

$$(CH_4 + CH_2H_4) + 3H_2O = 3CO + 7H_2$$

If heat required for the reaction is applied to the reaction chamber by external, e.g. recuperative heating means, it will be avoided that foreign bodies which may disturb the reaction get into the reaction chamber, which cannot be safely prevented, for instance, in case of a regenerative heating. If desired, however, it is possible to use any other heating method, for instance, inductive heating.

For the oxydation step, it is advantageous to heat the oxydizing gases, prior to mixing the same with the decomposed gas, to a temperature which is sufficient to permanently maintain the reaction temperature. Since the oxidizing gases do not require further heating in the reaction chamber, the reaction velocity is considerably increased.

Advantageously cracked gas, from which the olefines may have been removed prior to combustion, is used for preheating the initial material and/or the oxidizing gases and/or for heating the reaction chamber. By this measure, the necessity of using additional heating means for producing the reaction temperature is dispensed with.

According to a further improvement of the method according to the invention the olefines are removed from the decomposed gas before the oxidation and only the remaining gas is subjected to the treatment with oxidizing gases. By oxidation of the remaining gas with air and oxygen only in the respective stoichiometric proportion, the standard gas for the synthesis of ammonia can be produced. The separated olefines are advantageously processed into technically important initial substances for the production of synthetic materials, e.g., ethylene chloride, so that in addition to the desired final product, substances are produced which are important raw materials for the production of synthetic materials.

Furthermore it has been found that advantageously small quantities of hydrogen, but not more than 10% of the weight of the initial material are admixed to the same, if desired in the form of hot gas from the second reaction phase, since hydrogen acts to further reduce the already insignificant formation of aromatic substances and tar in the decomposition phase.

It is also possible to use the hot final product for preheating the initial product and/or the oxidizing gases, so that decomposed gas need not be burnt for the preheating.

As decomposing catalysts for the selective decomposition of hydrocarbons which catalysts are able to absorb and deliver electrons on their active boundary surfaces, catalytic substances are adapted which consist of pure or mixed oxide compounds, chiefly of the elements Al, Mg, Ca, Zn, Cd, Si, B, Sn, Li, Ti, Be, Zr, Mo etc., alone or mixed with each other. Mixtures of the said compounds having an active surface of 200–800 cm.²/gr. and a specific gravity of about 3.0–4.2 gr./cm.³, whose pores thus have very small diameters, proved to be most favorable.

If steam, air or oxygen alone or in mixtures with each other are used as oxidizing gases, it is advisable, in order to increase the reaction velocity, to pass the decomposed gas from the decomposing phase over dehydrogenating catalysts.

The catalytic material of hte decomposing or dehydrogenating catalysts is advantageously formed into heat transmitting bodies which may be of any shape but should be of identical shape, these bodies are then heated outside of the reaction chamber to the reaction temperature and are passed through the reaction chamber as a travelling bed which is traversed in counter current flow by the initial materials. The initial material to be converted is thus offered a large catalytic surface without impeding passage through the reaction chamber. It is also possible, however, to fill the reaction chamber for instance with a lattice-work of bricks of catalytic material and/or to line the walls of the reaction chamber with such bricks or to have the catalyst run through the reaction chamber in the form of powder. In order to save catalytic material, the same may be deposited in inert carriers.

Since the high-molecular hydrocarbons, e.g. residues of petroleum, frequently contain sulphur, it is advantageous to use catalysts which will not be attacked by sulphur.

The method according to the invention will be better understood by reference to the following examples.

*Example 1.*—1000 kgs. of a heating oil with a proportion of C:H=7.5 and a specific gravity of 0.95 were heated to 150° C. and passed, together with a mixture of steam and hydrogen, over decomposing catalysts heated to 680° C. and consisting of a mixture of Al₂O₃,MgO and SiO₂. The yield from 1000 kgs. of heating oil was 600 cbm. of a decomposed gas with a composition, by volume, of about 30% olefines ⎫ with 2.3 and 4 C
20% paraffines ⎭ atoms in the molecule
20% CH₄
20% H₂
6% CO
4% CO₂

This decomposed gas was then passed, together with 700 kgs. of steam preheated to 750° C., over dehydrogenating catalysts. The yield was 2200 cbm. of a gas with a composition, by volume, of about 52% H₂
22% CH₄
18% CO
4% C_nH_m
4 % CO₂

The calorific value of this gas amounted to 4300 kcal./Nm.³.

*Example 2.*—1000 kgs. of the same heating oil were converted into a decomposed gas of the same quantity and composition as in Example 1 by the same process step. This decomposed gas was then passed, together with a mixture, preheated to 600° C., of 800 kgs. of steam and 300 kgs. of oxygen over dehydrogenating catalysts permanently held on a temperature of 850° C. The yield was 3300 cbm. of a gas mixture of approximately the following composition, by volume:

34% CO
56% H₂
10% CO₂

The methane content was below 0.4%, the calorific value was about 2800–3000 kcal./Nm³.

While the invention has been described in detail with respect to certain now preferred examples and embodiments of the invention it will be understood by those skilled in the art after understanding the invention that various changes and modifications may be made without departing from the spirit and scope of the invention and it is intended, therefore to cover all such changes and modifications in the appended claims.

I claim:

1. A method of converting a liquid hydrocarbon oil into substantially only hydrogen and lower carbon compounds containing only one carbon atom, comprising the steps of heating said liquid hydrocarbon oil in a first stage in the presence of a decomposition catalyst for the selective decomposition of hydrocarbons, said catalyst being able to absorb and deliver electrons on its active boundary surfaces and being selected from the group consisting of oxides of aluminum, magnesium, calcium, zinc, cadmium, silicon, boron, tin, lithium, titanium, beryllium, zirconium, and molybdenum, at a temperature sufficiently high to split said liquid hydrocarbon oil into a gas consisting mainly of lower molecular weight gaseous carbon compounds and hydrogen; and heating the thus obtained gas during a second stage with an oxidizing gas at a temperature sufficiently high to oxidize said lower molecular weight gaseous carbon compounds, thereby obtaining a gaseous reaction mass consisting essentially of hydrogen and carbon compounds containing only one carbon atom.

2. A method of converting a liquid hydrocarbon oil into substantially only hydrogen and lower carbon compounds containing only one carbon atom, comprising the steps of heating said liquid hydrocarbon oil in a first stage in the presence of a decomposition catalyst for the selective decomposition of hydrocarbons, said catalyst being able to absorb and deliver electrons on its active boundary surfaces and having an active surface of 200–800 cm.$^2$/gr. and a specific gravity of about 3.0–4.2 gr./cm.$^3$, at a temperature sufficiently high to split said liquid hydrocarbon oil into a gas consisting mainly of lower molecular weight gaseous carbon compounds and hydrogen; and heating the thus obtained gas during a second stage with an oxidizing gas at a temperature sufficiently high to oxidize said lower molecular weight gaseous carbon compounds, thereby obtaining a gaseous reaction mass consisting essentially of hydrogen and carbon compounds containing only one carbon atom.

3. A method of converting a liquid hydrocarbon oil into substantially only hydrogen and lower carbon compounds containing only one carbon atom, comprising the steps of heating said liquid hydrocarbon oil in a first stage in the presence of a decomposition catalyst for the selective decomposition of hydrocarbons, said catalyst being able to absorb and deliver electrons on its active boundary surfaces, at a temperature of at least 500° C. so as to split said liquid hydrocarbon oil into a gas consisting mainly of lower molecular weight gaseous carbon compounds and hydrogen; and heating the thus obtained gas during a second stage with an oxidizing gas at a temperature sufficiently high to oxidize said lower molecular weight gaseous carbon compounds, thereby obtaining a gaseous reaction mass consisting essentially of hydrogen and carbon compounds containing only one carbon atom.

4. A method of converting a liquid hydrocarbon oil into substantially only hydrogen and lower carbon compounds containing only one carbon atom, comprising the steps of heating said liquid hydrocarbon oil in a first stage in the presence of a decomposition catalyst for the selective decomposition of hydrocarbons, said catalyst being able to absorb and deliver electrons on its active boundary surfaces, at a temperature of 600–750° C. so as to split said liquid hydrocarbon oil into a gas consisting mainly of lower molecular weight gaseous carbon compounds and hydrogen; and heating the thus obtained gas during a second stage with an oxidizing gas at a temperature sufficiently high to oxidize said lower molecular weight gaseous carbon compounds, thereby obtaining a gaseous reaction mass consisting essentially of hydrogen and carbon compounds containing only one carbon atom.

5. A method of converting a liquid hydrocarbon oil into substantially only hydrogen and lower carbon compunds containing only one carbon atom, comprising the steps of heating said liquid hydrocarbon oil in a first stage in the presence of a decomposition catalyst for the selective decomposition of hydrocarbons, said catalyst being able to absorb and deliver electrons on its active boundary surfaces, at a temperature of 600–750° C. so as to split said liquid hydrocarbon oil into a gas consisting mainly of lower molecular weight gaseous carbon compounds and hydrogen; and heating the thus obtained gas during a second stage with an oxidizing gas at a temperature of 700–900° C. so as to oxidize said lower molecular weight gaseous carbon compounds, thereby obtaining a gaseous reaction mass consisting essentially of hydrogen and carbon compounds containing only one carbon atom.

6. A method of converting a liquid hydrocarbon oil into substantially only hydrogen and lower carbon compounds containing only one carbon atom, comprising the steps of heating said liquid hydrocarbon oil in a first stage in the presence of a decomposition catalyst for the selective decomposition of hydrocarbons, said catalyst being able to absorb and deliver electrons on its active boundary surfaces, at a temperature sufficiently high to split said liquid hydrocarbon oil into a gas consisting mainly of lower molecular weight gaseous carbon compounds including olefinic compounds and hydrogen; separating said olefinic compounds from the thus obtained gas; and heating the remaining gas free of olefinic compounds during a second stage with an oxidizing gas at a temperature sufficiently high to oxidize said gaseous carbon compounds, thereby obtaining a lower molecular weight gaseous reaction mass consisting essentially of hydrogen and carbon compounds containing only one carbon atom.

7. A method of converting a liquid hydrocarbon oil into substantially only hydrogen and lower carbon compounds containing only one carbon atom, comprising the steps of heating said liquid hydrocarbon oil in a first stage in the presence of a decomposition catalyst for the selective decomposition of hydrocarbons, said catalyst being able to absorb and deliver electrons on its active boundary surfaces, at a temperature sufficiently high to split said liquid hydrocarbon oil into a gas consisting mainly of lower molecular weight gaseous carbon compounds and hydrogen; and heating the thus obtained gas during a second stage with an oxidizing gas in an amount sufficient only to react with the gaseous carbon compounds of more than one carbon atom and at a temperature sufficiently high to oxidize said lower molecular weight gaseous carbon compounds, thereby obtaining a gaseous reaction mass consisting essentially of hydrogen and carbon compounds containing only one carbon atom.

8. A method of converting a liquid hydrocarbon oil into substantially only hydrogen and lower carbon compounds containing only one carbon atom, comprising the steps of mixing said liquid hydrocarbon oil containing at least four carbon atoms with up to 10% by weight of hydrogen; heating the thus formed mixture in a first stage in the presence of a decomposition catalyst for the selective decomposition of hydrocarbons, said catalyst being able to absorb and deliver electrons on its active boundary surfaces, at a temperature sufficiently high to split said liquid hydrocarbon oil into a gas and consisting mainly of lower molecular weight gaseous carbon compounds and hydrogen; and heating the thus obtained gas during a second stage with an oxidizing gas at a temperature sufficiently high to oxidize said lower molecular weight gaseous carbon compounds, thereby obtaining a gaseous reaction mass consisting essentially of hydrogen and carbon compounds containing only one carbon atom.

9. A method of converting a liquid hydrocarbon oil into substantially only hydrogen and lower carbon compounds containing only one carbon atom, comprising the steps of heating said liquid hydrocarbon oil in a first stage in the presence of a decomposition catalyst for the selective decomposition of hydrocarbons, said catalyst being able to absorb and deliver electrons on its active boundary surfaces, at a temperature sufficiently high to split said liquid hydrocarbon into a gas consisting mainly of lower molecular weight gaseous carbon compounds and hydrogen; and heating the thus obtained gas during a second stage with an oxidizing gas at a temperature sufficiently high to oxidize said lower molecular weight gaseous carbon compounds, thereby obtaining a gaseous reaction mass consisting essentially of hydrogen and carbon compounds containing only one carbon atom.

References Cited in the file of this patent

UNITED STATES PATENTS

| | | |
|---|---|---|
| 1,673,032 | Williams | June 12, 1928 |
| 1,934,836 | Wietzel et al. | Nov. 14, 1933 |
| 1,955,290 | Haslam | Apr. 17, 1934 |
| 1,957,743 | Wietzel et al. | May 8, 1934 |
| 1,967,669 | Hickey | July 24, 1934 |
| 2,056,911 | Schiller et al. | Oct. 6, 1936 |
| 2,445,328 | Keith | July 20, 1948 |
| 2,692,193 | Riesz et al. | Oct. 19, 1954 |
| 2,693,441 | Helmers | Nov. 2, 1954 |

FOREIGN PATENTS

| | | |
|---|---|---|
| 693,724 | Great Britain | July 8, 1953 |